(12) United States Patent
Watanabe

(10) Patent No.: US 7,553,587 B2
(45) Date of Patent: Jun. 30, 2009

(54) NON-AQUEOUS ELECTROLYTE SECONDARY BATTERY AND METHOD OF MANUFACTURING THE SAME

(75) Inventor: Kozo Watanabe, Osaka (JP)

(73) Assignee: Panasonic Corporation, Osaka (JP)

( * ) Notice: Subject to any disclaimer, the term of this patent is extended or adjusted under 35 U.S.C. 154(b) by 49 days.

(21) Appl. No.: 11/646,286

(22) Filed: Dec. 28, 2006

(65) Prior Publication Data

US 2007/0231700 A1    Oct. 4, 2007

(30) Foreign Application Priority Data

Mar. 30, 2006  (JP) .............................. 2006-094003

(51) Int. Cl.
*H01M 2/16* (2006.01)

(52) U.S. Cl. .................. 429/246; 429/251; 429/223; 429/218.1; 29/623.5

(58) Field of Classification Search ............ 429/246, 429/251, 223, 218.1; 29/623.5
See application file for complete search history.

(56) References Cited

U.S. PATENT DOCUMENTS

| | | | |
|---|---|---|---|
| 5,824,434 A | | 10/1998 | Kawakami et al. |
| 6,296,969 B1 | | 10/2001 | Yano et al. |
| 2002/0160256 A1 | | 10/2002 | Kami et al. |
| 2007/0020524 A1 * | | 1/2007 | Kim et al. .................. 429/246 |

FOREIGN PATENT DOCUMENTS

| | | |
|---|---|---|
| JP | 6-196199 | 7/1994 |
| JP | 09-216964 | 8/1997 |
| JP | 11-121038 | 4/1999 |
| JP | 11-283603 | 10/1999 |
| JP | 2001-093498 | 4/2001 |
| JP | 2002-170541 | 6/2002 |
| JP | 2005-222780 * | 8/2005 |

* cited by examiner

*Primary Examiner*—Laura S Weiner
(74) *Attorney, Agent, or Firm*—Wenderoth, Lind & Ponack, L.L.P.

(57) ABSTRACT

A non-aqueous electrolyte secondary battery has an insulating porous membrane, on at least one of a positive electrode, negative electrode, and separator thereof. The membrane contains an inorganic filler, and an active agent for dispersing the inorganic filler uniformly.

6 Claims, 5 Drawing Sheets

NON-AQUEOUS ELECTROLYTE SECONDARY BATTERY AND METHOD OF MANUFACTURING THE SAME

BACKGROUND OF THE INVENTION

1. Field of the Invention

The present invention relates to a non-aqueous electrolyte secondary battery and a method of manufacturing the battery, more particularly to a heat-resistant insulating porous membrane provided on the surface of the negative electrode, positive electrode, or separator thereof.

2. Background Art

With the advancement of portable and cordless electronic equipment, there are growing expectations for smaller and more lightweight non-aqueous electrolyte secondary batteries having higher energy density. For such batteries predominated by lithium secondary batteries, their high energy density necessitates considerations of the design for improving safety. Particularly when a micro-porous membrane made of a polyolefin resin, such as polyethylene and polypropylene, is used as a separator, the membrane is likely to shrink and cause short circuits even at temperatures up to 150° C. In addition, when a sharp projection, such as a nail, penetrates through the battery, heat instantaneously generated by short circuits further develops the short-circuited area. Further, reaction heat added thereto can cause an abnormally high-temperature state of the battery.

Proposed to address this problem is a technique in which a porous membrane containing an inorganic filler and binder is provided on the surface of the positive or negative electrode of a battery. This membrane prevents direct contact between the positive and negative electrodes and further increases in the temperature of the battery even when the battery is at an abnormally high temperature and a minute portion of the separator is broken. In formation of such a micro-porous membrane, an inorganic filler and a binder are kneaded in the existence of a dispersion medium to provide a paste, and the paste is applied to the surface of the positive or negative electrode, and dried. Such a proposal is disclosed in Japanese Patent Unexamined Publication No. 2005-222780.

However, oxides, such as aluminum oxide, titanium oxide, and magnesium oxide, used as inorganic fillers are likely to agglomerate. Further, such oxides have hydrophilic terminal groups, such as hydroxyl groups, on the surface thereof, and thus the oxides are likely to adsorb moisture. For these reasons, such oxides are more likely to agglomerate through water molecules adsorbed in the existence of moisture. Thus, when such a material is used as an inorganic filler, the inorganic filler agglomerates in preparation of a paste and the dispersibility of the inorganic filler in the paste deteriorates. In this manner, the use of a paste prepared with the agglomerated inorganic filler makes the thickness of the porous membrane non-uniform. This causes variations in the distance between the positive and negative electrodes, and non-uniformity of battery reaction, and gives influences on battery characteristics, such as deterioration of charge-discharge cycle characteristics. When the porous membrane has an extremely non-uniform thickness, and a minute portion of the separator is broken by heat generation, a thin portion of the membrane is broken by thermal expansion of the positive or negative electrode and cannot prevent direct contact between the positive and negative electrodes. Thus, the porous membrane cannot accomplish the intended purpose thereof.

SUMMARY OF THE INVENTION

A non-aqueous electrolyte secondary battery of the present invention has an insulating porous membrane on the surface of at least one of a positive electrode, a negative electrode, and a separator. The porous membrane is composed of an inorganic filler and an active agent to uniformly disperse the inorganic filler.

DETAILED DESCRIPTION OF THE INVENTION

Hereinafter, exemplary embodiments of the present invention are demonstrated with reference to the accompanying drawings. The present invention is not limited to the descriptions provided below as far as it is based on the fundamental characteristics described herein.

FIRST EXEMPLARY EMBODIMENT

Figure 1:
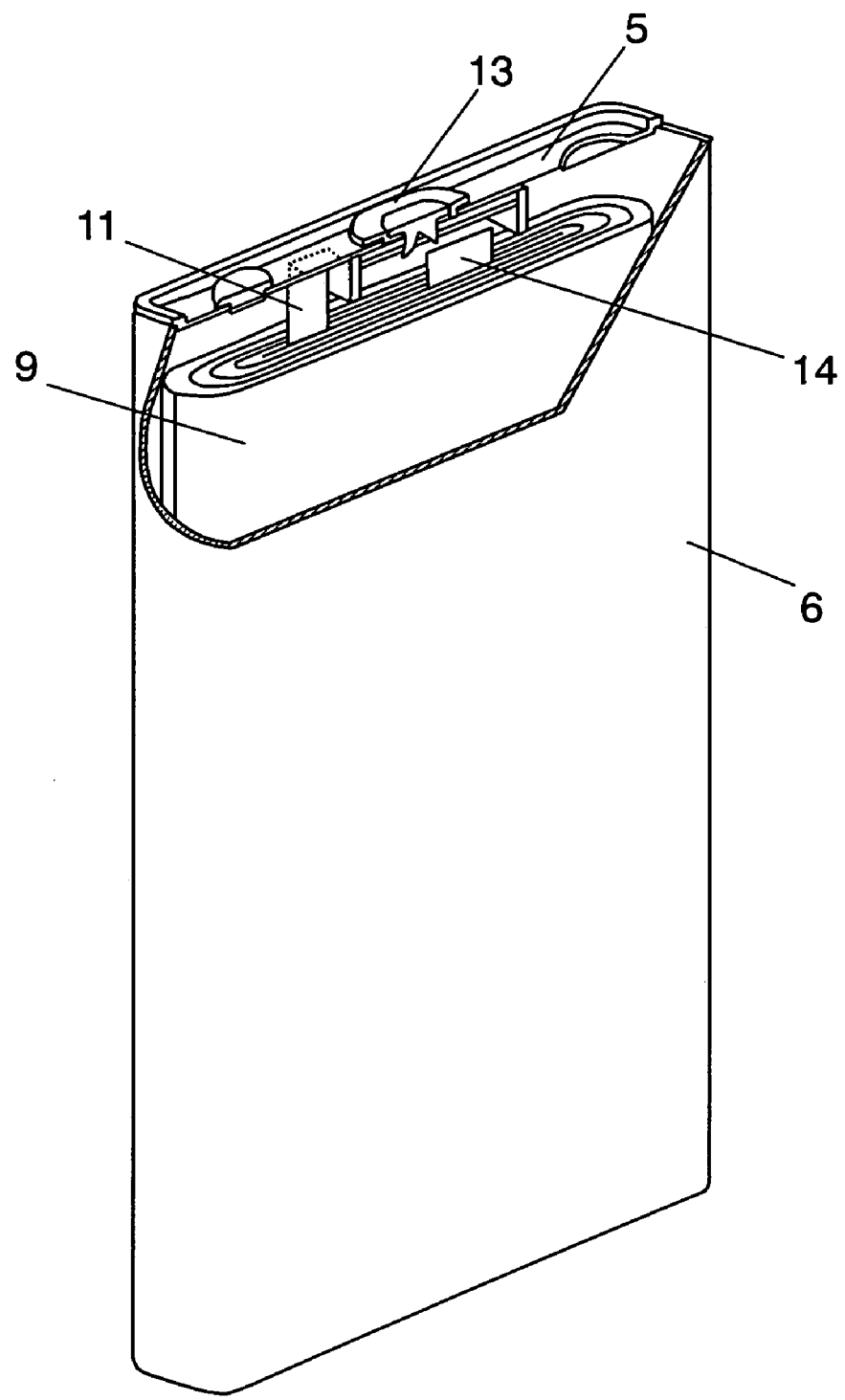
FIG. 1 is a partially cutaway view in perspective of a non-aqueous electrolyte secondary battery in accordance with a first exemplary embodiment of the present invention.
Figure 2:
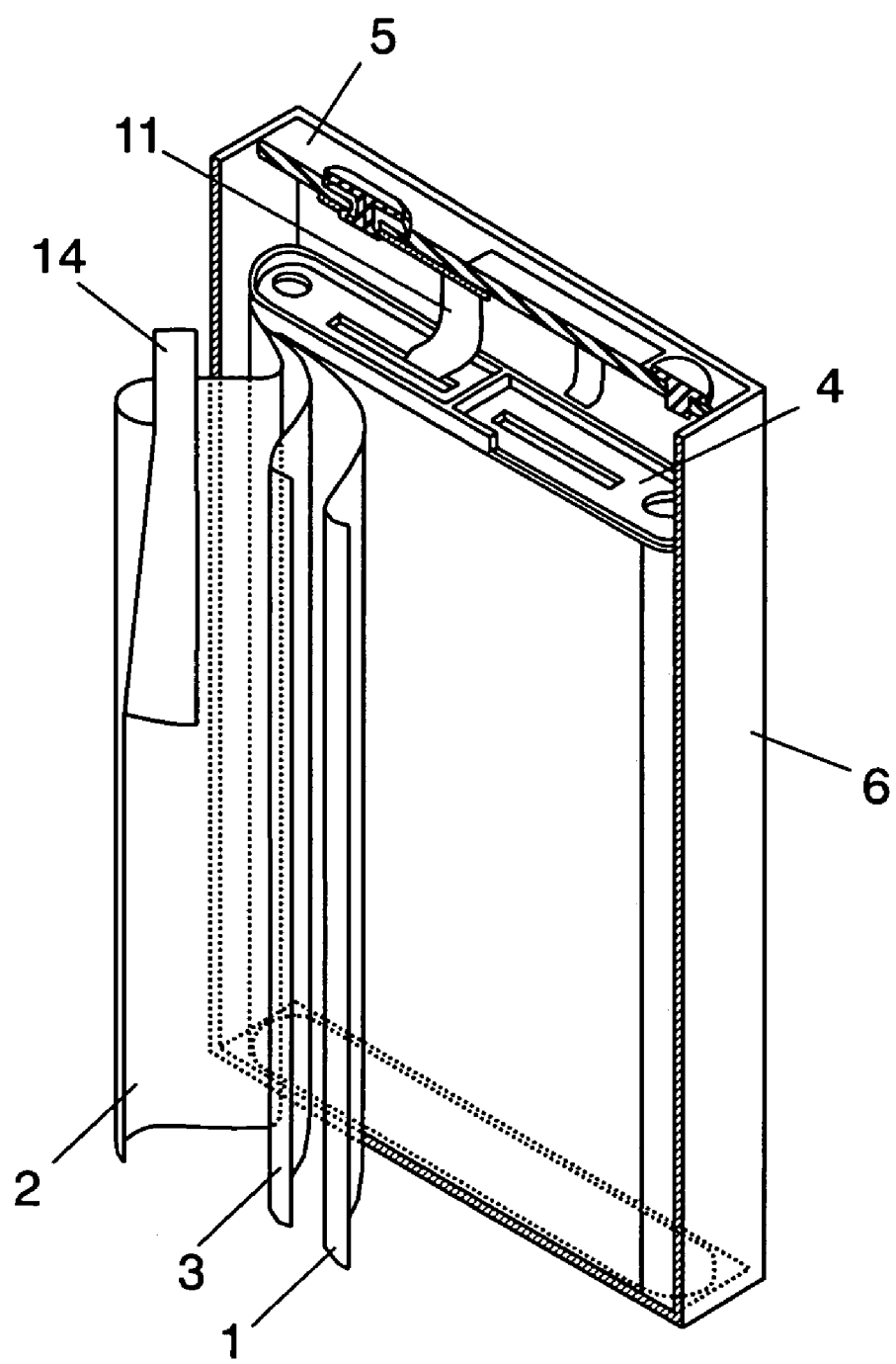
FIG. 2 is an exploded view in perspective of the non-aqueous electrolyte secondary battery of FIG. 1.
Figure 3:
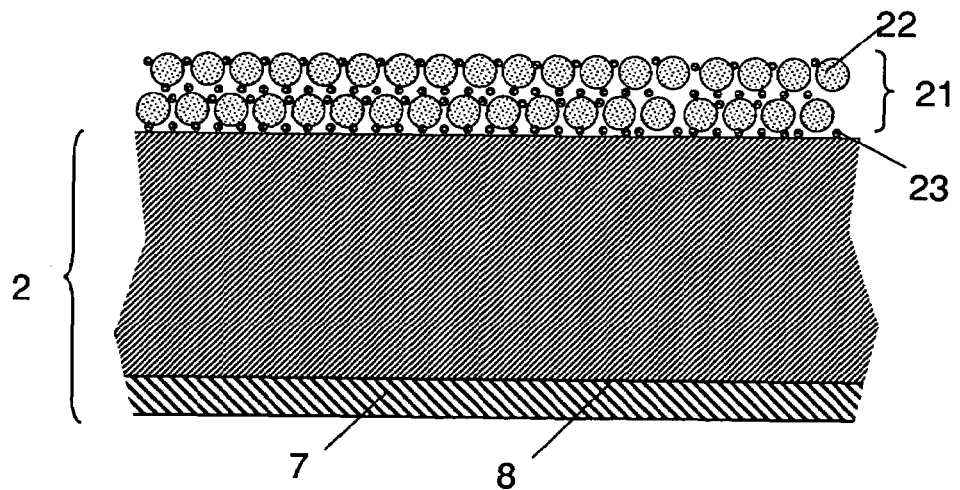
FIG. 3 is a conceptual sectional view of a positive electrode of the non-aqueous electrolyte secondary battery of FIG. 1.

FIG. 1 is a partially cutaway view in perspective of a non-aqueous electrolyte secondary battery in accordance with the first exemplary embodiment of the present invention. FIG. 2 is an exploded view in perspective of the non-aqueous electrolyte secondary battery. FIG. 3 is a conceptual section of a positive electrode of the non-aqueous electrolyte secondary battery. This prismatic battery includes negative electrode 1, positive electrode 2 facing negative electrode 1 and reducing lithium ions during discharge, and separator 3 disposed between positive electrode 1 and negative electrode 2 and preventing direct contact therebetween. Negative electrode 1 and positive electrode 2 are wound together with separator 3 to form electrode body 9. Electrode body 9 is housed in case 6 together with a non-aqueous electrolyte disposed between negative electrode 1 and positive electrode 2, which is a non-aqueous electrolytic solution not shown in the drawing. Disposed on electrode body 9 is frame 4 made of a resin that not only separates electrode body 9 from sealing plate 5 but also separates lead 11 from case 6.

Negative electrode 1 includes a current collector and a negative electrode mixture layer provided on the surface of the current collector. Lead 11 is attached to the current collector. The other end of lead 11 is connected to terminal 13 provided on sealing plate 5.

Positive electrode 2 includes current collector 7, positive electrode mixture layer 8 containing a positive electrode active material, and insulating porous membrane 21 provided on the surface of positive electrode mixture layer 8. Lead 14 is attached to current collector 7. The other end of lead 14 is connected to case 6 also working as a positive terminal. On both sides of current collector 7, positive electrode mixture layer 8 and insulating porous membrane 21 are formed. FIG. 3 shows the structure thereof only on one side.

The negative electrode mixture layer contains at least an active material capable of intercalating and de-intercalating lithium ions. The examples of the active material include carbon materials, such as graphite and amorphous carbon. Alternatively, the examples include silicon (Si) and tin (Sn), i.e. materials capable of intercalating and de-intercalating a larger quantity of lithium ions at a lower voltage than the positive electrode active material. The active material made of such a material can exert the advantages of the present invention even if it is any one of single elements, alloys, compounds, solid solutions, and composites containing a silicon-containing material or a tin-containing material. Particularly the silicon-containing materials are preferable because they have large capacity density and are inexpensive. In other words, used as the silicon-containing materials are Si, $SiO_x$ ($0.05<x<1.95$), and their alloys, compounds, or solid solutions in which a part of Si is substituted by at least one element selected from the group consisting of B, Mg, Ni, Ti, Mo, Co, Ca, Cr, Cu, Fe, Mn, Nb, Ta, V, W, Zn, C, N, and Sn. The tin-containing materials include $Ni_2Sn_4$, $Mg_2Sn$, $SnO_x$ ($0<x<2$), $SnO_2$, $SnSiO_3$, and LiSnO.

Each of these materials may constitute the negative electrode active material by itself or in combination of a plurality of kinds. Examples of the negative electrode active material made of a plurality of kinds of the above materials include: compounds, each containing Si, oxygen, and nitrogen; and composites, each containing Si and oxygen, and made of a plurality of kinds of compounds that have different composition ratios of Si and oxygen. Among these materials, $SiO_x$ ($0.3 \leq x \leq 1.3$) is preferable, because it has a large discharge capacity density and an expansion coefficient smaller than that of the single element Si during charging.

The negative electrode mixture layer further contains a binder. The examples of the binder include: polyvinylidenefluoride (PVDF), polytetrafluoroethylene, polyethylene, polypropylene, an aramid resin, polyamide, polyimide, polyamide-imide, polyacrylonitrile, polyacrylic acid, polymethylacrylate, polyethylacrylate, polyhexylacrylate, polymethacrylic acid, polymethylmethacrylate, polyethyl methacrylate, polyhexyl methacrylate, polyvinyl acetate, polyvinyl pyrrolidone, polyether, polyethersulfone, hexafluoropolypropylene, styrene-butadiene rubber, and carboxymethylcellulose. Other materials usable for the binder include copolymers containing at least two kinds selected from tetrafluoroethylene, hexafluoroethylene, hexafluoropropylene, perfluoro alkyl vinyl ether, vinylidene fluoride, chlorotrifluoroethylene, ethylene, propylene, pentafluoropropylene, fluoromethyl vinyl ether, acrylic acid, and hexadiene.

A conductive agent may be mixed into the negative electrode mixture layer as required. The materials of the conductive agent include: natural graphite, such as scaly graphite; graphites, such as artificial graphite and expanded graphite; carbon blacks, such as acetylene black, Ketjen black, channel black, furnace black, lamp black, and thermal black; conductive fibers, such as carbon fiber and metal fiber; metal powders, such as copper powder and nickel powder; and organic conductive materials, such as a polyphenylene derivative.

For the current collector, lead 11, and terminal 13 of negative electrode 1, metal foil made of stainless steel, nickel, cupper, or titanium, and thin film made of carbon or conductive resin can be used. Additionally, surface treatment may be provided by carbon, nickel, or titanium.

Positive electrode mixture layer 8 contains a lithium-containing composite oxide, such as $LiCoO_2$, $NiNiO_2$, $LiMn_2O_4$, and mixtures and composites thereof, as its positive electrode active material. Particularly, $Li_xM_yN_{1-y}O_2$ (in the formula, each of M and N being at least one element selected from the group consisting of Co, Ni, Mn, Cr, Fe, Mg, Al and Zn, at least one of M and N being Ni, M≠N, $0.98 \leq x \leq 1.10$, and $0<y<1$) has a large capacity density, and thus is preferable.

Other materials usable as the positive electrode active material include: olivine-type lithium phosphates expressed by the general formula of $LiMPO_4$ (M=V, Fe, Ni, and Mn); and lithium fluorophosphates expressed by the general formula of $Li_2MPO_4F$ (M=V, Fe, Ni, and Mn). Further, a part of each of these lithium-containing compounds may be substituted by different kinds of elements. Surface treatment may be provided by a metal oxide, lithium oxide, or conductive agent. Alternatively, hydrophobic treatment may be provided on the surface thereof.

Positive electrode mixture layer 8 further contains a conductive agent and a binder. Materials of the conductive agent include: graphites, such as natural graphite and artificial graphite; carbon blacks, such as acetylene black, Ketjen black, channel black, furnace black, lamp black, and thermal black; conductive fibers, such as carbon fiber and metal fiber; metal powders, such as fluorocarbon powder and aluminum powder; conductive whiskers, such as zinc oxide whisker and potassium titanate whisker; conductive metal oxides, such as titanium oxide; and organic conductive materials, such as a phenylene derivative.

The materials of the binder include: PVDF, polytetrafluoroethylene, polyethylene, polypropylene, an aramid resin, polyamide, polyimide, polyamide-imide, polyacrylonitrile, polyacrylic acid, polymethylacrylate, polyethylacrylate, polyhexylacrylate, poly methacrylic acid, polymethyl methacrylate, polyethyl methacrylate, polyhexyl methacrylate, polyvinyl acetate, polyvinyl pyrrolidone, polyether, polyethersulfone, hexafluoropolypropylene, styrene-butadiene rubber, and carboxymethylcellulose. Other materials usable for the binder include copolymers containing at least two kinds selected from tetrafluoroethylene, hexafluoroethylene, hexafluoropropylene, perfluoro alkyl vinyl ether, vinylidene fluoride, chlorotrifluoroethylene, ethylene, propylene, pentafluoropropylene, fluoromethyl vinyl ether, acrylic acid, and hexadiene. At least two kinds selected from these materials may be mixed.

The materials usable for current collector 7, lead 14, and case 6 include aluminum (Al), carbon, and conductive resin. Surface treatment may be provided on any of these materials by carbon or other materials.

The materials usable for the non-aqueous electrolyte include: a non-aqueous electrolyte solution dissolving a solute in an organic solvent; and a polymer electrolyte layer containing such non-aqueous electrolyte solution immobilized with a polymer. When an electrolyte solution is used, it is preferable to use separator 3 of a nonwoven fabric or micro-porous membrane made of materials, such as polyethylene, polypropylene, an aramid resin, amide-imide, polyphenylene sulfide, and polyimide, between positive electrode 2 and negative electrode 1, and to impregnate the separator with the electrolyte solution.

The materials of the non-aqueous electrolyte are selected according to the oxidation-reduction potential of the active material. The preferable materials for the solute of the non-aqueous electrolyte are the salts generally used for lithium batteries. Such salts include: $LiPF_6$; $LiBF_4$; $LiClO_4$; $LiAlCl_4$; $LiSbF_6$; LiSCN; $LiCF_3SO_3$; $LiCF_3CO_2$; $LiN(CF_3SO_2)_2$; $LiAsF_6$; $LiB_{10}Cl_{10}$; lower aliphatic lithium carboxylate; LiF; LiCl; LiBr; LiI; chloroborane lithium; various borates such as bis(1,2-benzenediolate (2-)—O,O') lithium borate, bis(2,3-naphthalenediolate (2-)—O,O') lithium borate, bis(2,2'-biphenyldiolate (2-)—O,O') lithium borate, bis(5-fluoro-2-olate-1-benzenesulfonic acid-O,O') lithium borate; and tetraphenyl lithium borate.

Further, for the organic solvent in which the above salts are dissolved, those commonly used for lithium batteries can be used. The examples of the organic solvent include the following which may be used either by itself or in combination: ethylene carbonate (EC); propylene carbonate; butylene carbonate; vinylene carbonate; dimethyl carbonate (DMC); diethyl carbonate; ethyl methyl carbonate (EMC); dipropyl carbonate; methyl formate; methyl acetate; methyl propionate; ethyl propionate; dimethoxymethane; γ-butyrolactone; γ-valerolactone; 1,2-diethoxyethane; 1,2-dimethoxyethane; ethoxymethoxyethane; trimethoxy methane; tetrahydrofuran derivatives, such as tetrahydrofuran and 2-methyl-tetrahydrofuran; dimethyl sulfoxide; dioxolane derivatives, such as 1,3-dioxolane and 4-methyl-1,3-dioxolane; formamide; acetamide; dimethylformamide; acetonitrile; propylnitrile; nitromethane; ethylmonoglyme; triester phosphate; acetate ester; propionate ester; sulfolane; 3-methyl-sulfolane; 1,3-dimethyl-2-imidazolidinone; 3-methyl-2-oxazolidinone; a propylene carbonate derivative; ethyl ether; diethyl ether; 1,3-propanesultone; anisole; and fluorobenzene.

The organic solvent may further contain an additive, such as vinylene carbonate, cyclohexylbenzene, biphenyl, diphenyl ether, vinylethylene carbonate, divinylethylene carbonate, phenylethylene carbonate, diallyl carbonate, fluoroethylene carbonate, catechol carbonate, vinyl acetate, ethylene sulfite, propanesultone, trifluoropropylene carbonate, dibenzofuran, 2,4-difluoroanisole, o-terphenyl, and m-terphenyl.

The above non-aqueous electrolyte may be used as a solid electrolyte by mixing one of the above solutes into at least one of the following polymeric materials: polyethylene oxide, polypropylene oxide, polyphosphazene, polyaziridine, polyethylene sulfide, polyvinyl alcohol, polyvinylidene fluoride, and polyhexafluoropropylene. Alternatively, the non-aqueous electrolyte may be used in gel form by mixing with one of the above organic solvents. Further, inorganic materials usable as a solid electrolyte include: lithium nitrides, lithium halides, lithium oxyacid salts, $Li_4SiO_4$, $Li_4SiO_4$—LiI—LiOH, $Li_3PO_4$—$Li_4SiO_4$, $Li_2SiS_3$, $Li_3PO_4$—$Li_2S$—$SiS_2$, and phosphorus sulfide compounds.

Insulating porous membrane 21 formed on the surface of positive electrode mixture layer 8 contains inorganic filler 22 and active agent 23. The materials of inorganic filler 22 include the powders of aluminum oxide (alumina), silicon dioxide, titanium dioxide, zirconium oxide, and magnesium oxide. These materials may be used either by it self or in combination of at least two kinds. The shape of inorganic filler 22 is not specifically limited. Active agent 23 works to uniformly disperse inorganic filler 22. Because terminal groups, such as hydroxyl groups, exist on the surface of inorganic filler 22, a material having hydrophobic groups and hydrophilic groups can be used as a typical example of such active agent 23. In other words, the hydrophilic groups keep affinity with the terminal groups on the surface of inorganic filler 22. As a result, the hydrophobic groups are arranged on the outermost surface of inorganic filler 22 covered with active agent 23. For this reason, inorganic fillers 22 are unlikely to agglomerate each other. This improves the dispersibility of inorganic filler 22. Specifically, a silane coupling agent can be used as such a material. A titanium coupling agent can also be used. However, because a surface active agent generally used as detergent, such as fatty ester, is likely to adsorb moisture, care should be taken for use.

Figure 4:
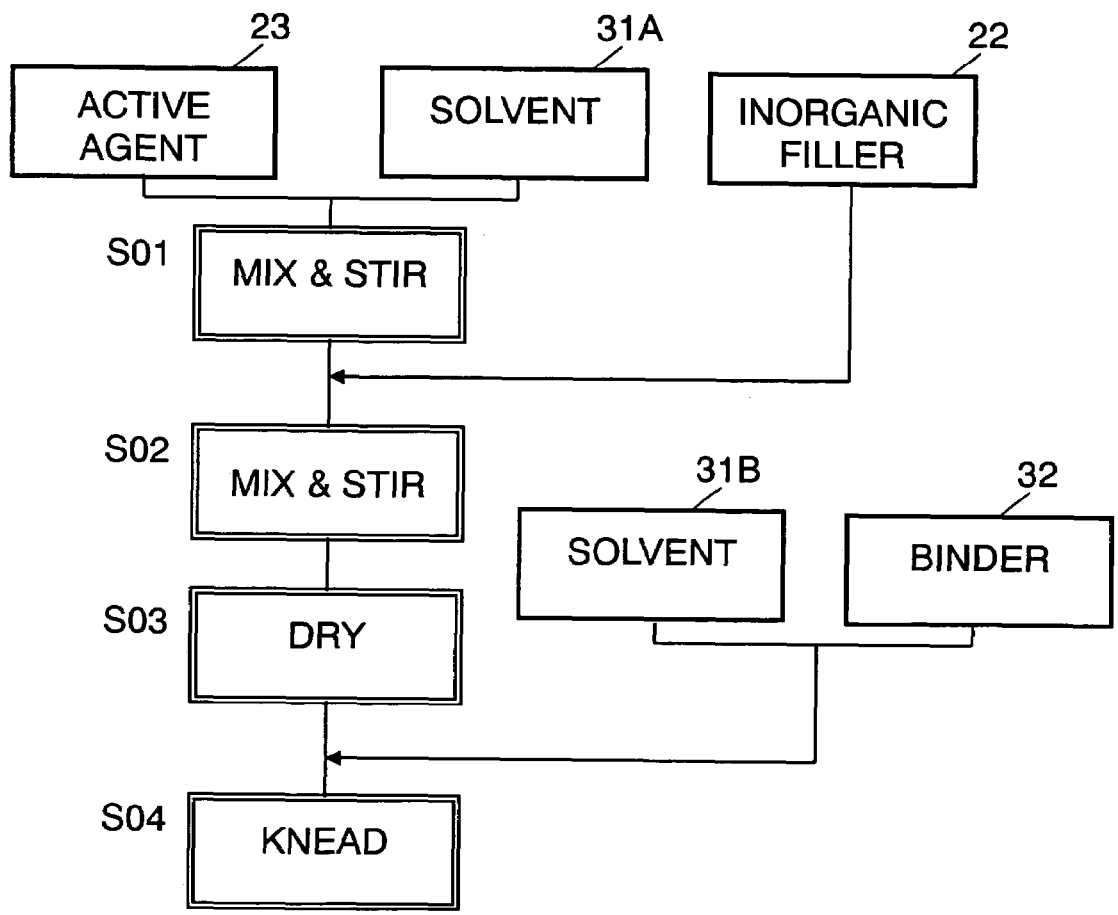
FIG. 4 is a flowchart showing a procedure of preparing a paste for forming an insulating porous membrane in accordance with the first exemplary embodiment.

Next, a procedure for forming insulating porous membrane 21 on the surface of positive electrode mixture layer 8 is explained with reference to FIG. 4. First, active agent 23 and solvent 31A are stirred (S01). At this time, used as solvent 31A is a non-aqueous solvent, such as xylene, methyl ethyl ketone (MEK), toluene, cyclohexanon, and N-methyl pyrrolidone (NMP), containing 0.1 wt % of water added thereto. Inorganic filler 22 is added to this mixture, which is further stirred (S02). The mixture of inorganic filler 22, active agent 23, and solvent 31A obtained in this manner is dried once (S03). Solvent 31B similar to solvent 31A, and, if necessary, binder 32 are added to the dried mixture, and then they are kneaded together (S04). Thus, a paste is prepared. This paste is applied to the surface of positive electrode mixture layer 8 by the doctor blade or other methods, and dried. Insulating porous membrane 21 is formed in this manner. The dispersibility of inorganic filler 22 is improved by mixing inorganic filler 22 and active agent 23 in advance in this manner, whereby the resulting insulating porous membrane 21 attains uniform thickness. This uniform thickness inhibits variations in the distance between positive electrode 2 and negative electrode 1 in the fabricated non-aqueous electrolyte secondary battery, thus making the battery reaction uniform and inhibiting deterioration of charge-discharge cycle characteristics, for example. In other words, insulating porous membrane 21 does not degrade battery characteristics. Further, even when a minute portion of separator 3 is broken by abnormal heating, direct contact between positive electrode 2 and negative electrode 1 is prevented, whereby the temperature of the non-aqueous secondary battery hardly increases.

The materials of the active material of positive electrode 2 are lithium-containing composite oxides or lithium phosphates, as described above. When a silane coupling agent is used as active agent 23, the hydrophilic groups of the silane coupling agent are adsorbed or bound to the surface terminal groups such as oxygen and hydroxyl groups of the active material made of an oxide or the like. As a result, hydrophobic groups are arranged on the outermost surface of inorganic filler 22 covered with active agent 23. The action of hydrophobic groups can inhibit moisture adsorption on insulating porous membrane 21, and prevent the atmospheric moisture from entering into the battery through insulating porous membrane 21. Because the moisture degrades the characteristics of non-aqueous electrolyte secondary batteries, it is preferable to inhibit the entry of moisture.

Lithium-containing composite oxides essentially consisting of nickel (i.e., composite oxides containing nickel) have high capacity density; however, they are likely to be decomposed by moisture. When such an oxide is used for the active material of positive electrode 2, the use of a silane coupling agent as active agent 23 can effectively inhibit the decomposition of the positive electrode active material. As a result, the deterioration of charge-discharge capacity can be inhibited even immediately after assembly. In other words, the use of a silane coupling agent as active agent 23 can also give an advantage of inhibiting the decomposition of the positive electrode active material.

Next, a description is provided of the advantages of this exemplary embodiment are explained with reference to specific examples. First, a method for fabricating a non-aqueous electrolyte secondary battery of Sample 1 is explained.

A positive electrode active material is prepared as following: $Li_2CO_3$ and $Co_3O_4$ are mixed, and the mixture is fired at a temperature of 900° C. for 10 hours, to provide $LiCoO_2$. X-ray powder diffraction shows that the obtained lithium-containing composite oxide has a single-phase hexagonal layer structure. Then, after pulverization and classification, a lithium-containing composite oxide powder having an average particle diameter of 12 μm is obtained.

One hundred parts by weight of the obtained lithium-containing composite oxide are mixed with 50 parts by weight of PVDF (NMP solution containing 12 wt % of solid), 4 parts by weight of acetylene black, and a proper amount of NMP, using a double-arm kneader at a temperature of 30° C. for 30 minutes, to provide a positive electrode mixture paste. This paste is applied to both sides of 20-μm-thick aluminum foil serving as current collector 7, and dried at a temperature of 120° C. for 15 minutes. Thereafter, the aluminum foil with the paste is rolled to have a total thickness of 160 μm. Then, the foil is cut into an elongate strip having such a width as to be insertable into rectangular case 6 having a height of 50 mm, a width of 34 mm, and a thickness of 10 mm, to provide positive electrode 2. A part of positive electrode mixture layer 8 is peeled off, and lead 14 is connected to current collector 7.

On the other hand, a paste is prepared in the following manner, which contains a silane coupling agent as active agent 23 and alumina as inorganic filler 22, and form insulating porous membrane 21. For Sample 1, as active agent 23, one part by weight of methyl trimethoxy silane (MTMS), i.e. a silane coupling agent, is mixed with 99 parts by weight of NMP, i.e. solvent 31A (S01). To the resulting mixture, 300 parts by weight of alumina having an average particle diameter of 0.3 μm is added and further stirred (S02). The mixture of inorganic filler 22, active agent 23, and solvent 31A obtained in this manner is dried at a temperature of 120° C. (S03). To 301 parts by weight of this dried mixture, 100 parts by weight of NMP, i.e. solvent 31B, and 150 parts by weight of PVDF (NMP solution having a solid content of 8 wt %), i.e. binder 32, are added and kneaded together (S04). A paste is prepared in this manner. The paste is applied to the surface of positive electrode mixture layer 8 by the doctor blade or other methods, and dried. Thus, insulating porous membrane 21 having a thickness of 0.5 μm is formed.

Next, a method of fabricating negative electrode 1 is described. One hundred parts by weight of artificial graphite, 7 parts by weight of a modified styrene-butadiene rubber (SBR) dispersion having a solid content of 40 wt %, and 1.6 parts by weight of carboxymethylcellulose (CMC) are mixed together with a proper amount of water, using a double-arm kneader, to provide a negative electrode mixture paste. This negative electrode mixture paste is applied to both sides of 12-μm-thick cupper foil serving as the current collector of negative electrode 1, and dried. Thereafter, the cupper foil with the paste is rolled to have a total thickness of 160 μm. Then, the foil is cut into an elongate strip having such a width as to be insertable into rectangular case 6 having a height of 50 mm, a width of 34 mm, and a thickness of 10 mm, to provide negative electrode 1. A part of the negative electrode mixture layer is peeled off, and lead 11 is connected to the current collector.

Positive electrode 2 and negative electrode 1 obtained in the above manner are wound together via separator 3, to provide spiral electrode body 9. Separator 3 is a 25-μm-thick composite micro-porous membrane of polyethylene and polypropylene.

Thereafter, electrical continuity is established between lead 11 and sealing plate 5 surrounded by an insulating gasket. On the other hand, electrical continuity is also established between case 6 and lead 14. An electrolyte solution is charged into case 6, and the opening of case 6 is sealed with sealing plate 5. The electrolyte solution contains 1.2 mol/L of $LiPF_6$ dissolved in a mix solvent of ethylene carbonate and methylethyl carbonate at a volume ratio of 1:3. Three charge-discharge cycles are repeated for the battery obtained in this manner. Each cycle is performed at a constant current of 300 mA, a charge ending voltage of 4.1 V, and a discharge ending voltage of 3.0V. Thus, a prismatic battery having a height of 50 mm, a width of 34 mm, and a thickness of 5 mm is fabricated. The designed capacity of the battery is 1,000 mAh.

For a non-aqueous electrolyte secondary battery of Sample 2, a lithium-containing composite oxide expressed by the composition formula of $LiNi_{1/3}Co_{1/3}Mn_{1/3}O_2$ is used as a positive electrode active material in the similar procedure of fabricating Sample 1. This lithium-containing composite oxide is prepared in the following manner.

Cobalt sulfate and manganese sulfate are added in a predetermined ratio to a nickel sulfate aqueous solution to provide a saturated solution. While this saturated solution is stirred at low speeds, an alkaline solution dissolving sodium hydrate is dropped for neutralization. In this manner, a ternary hydroxide of $Ni_{1/3}Co_{1/3}Mn_{1/3}(OH)_2$ is co-precipitated. The resulting co-precipitate is filtered off, rinsed with water, and dried at 80° C. This hydroxide is heat-treated in the atmospheric air at 380° C. for 10 hours, to provide a ternary oxide of $Ni_{1/3}Co_{1/3}Mn_{1/3}O$. X-ray power diffraction shows that the oxide has a single phase. Next, lithium hydroxide monohydrate is added to the obtained oxide so that the ratio between the total number of Ni, Co, and Mn atoms and the number of Li atoms becomes 1:1. Thereafter, the mixture is heat-treated in the dry air at 1,000° C. for 10 hours. In this manner, intended $LiNi_{1/3}Co_{1/3}Mn_{1/3}O_2$ is obtained. X-ray power diffraction shows that the obtained lithium-containing composite oxide has a single-phase hexagonal layer structure and that a solid solution containing Co and Mn is formed. Then, after pulverization and classification, a lithium-containing composite oxide powder having an average particle diameter of 12 μm is obtained.

Thus, the non-aqueous electrolyte secondary battery of Sample 2 is fabricated in the manner similar to that of Sample 1, except that the lithium-containing composite oxide prepared in the above manner is used.

For a non-aqueous electrolyte secondary battery of Sample 3, a lithium-containing composite oxide expressed by the composition formula of $LiNi_{0.80}Co_{0.15}Al_{0.05}O_2$ is used as a positive electrode active material in the similar procedure of fabricating Sample 1. This lithium-containing composite oxide is prepared in the following manner.

Cobalt sulfate and aluminum sulfate are added to a nickel sulfate aqueous solution, to provide a saturated solution. By neutralizing this saturated solution, precipitation of a ternary hydroxide of $Ni_{0.80}Co_{0.15}Al_{0.05}(OH)_2$ is obtained by the co-precipitation process. This precipitation is filtered off, rinsed with water, and dried at 80° C. This ternary hydroxide obtained is heat-treated in the atmospheric air at 600° C. for 10 hours, to provide a ternary oxide of $Ni_{0.80}Co_{0.15}Al_{0.05}O$. Next, lithium hydroxide monohydrate is added to the obtained oxide $Ni_{0.80}Co_{0.15}Al_{0.05}O$ so that the ratio between the total number of Ni, Co, and Al atoms and the number of Li atoms is 1:1. Thereafter, the mixture is heat-treated in the dry air at 800° C. for 10 hours. In this manner, intended $LiNi_{0.80}Co_{0.15}Al_{0.05}O_2$ is obtained. X-ray powder diffraction shows that the obtained lithium-containing composite oxide has a single-phase hexagonal layer structure and that a solid solution containing Co and Al is formed. Then, after pulverization and classification, a lithium-containing composite oxide powder is obtained.

Thus, the non-aqueous electrolyte secondary battery of Sample 3 is fabricated in the manner similar to that of Sample 1, except that the lithium-containing composite oxide prepared in the above manner is used.

For comparison with these Samples 1 through 3, non-aqueous electrolyte secondary batteries of Samples C1 through C3 are fabricated in a manner similar to those of Samples 1 through 3, except that the insulating porous membrane is formed without using any active agent.

Next, a method of evaluating these non-aqueous electrolyte secondary batteries is described. The secondary batteries are charged at a constant voltage of 4.2 V, until the charging current reaches down to 100 mA while the charging current is limited below 1 A, at an ambient temperature of 25° C., and discharged at a constant current of 1,000 mA to an ending voltage of 3.0 V, 30 minutes after the charging. Thus, the initial capacity thereof is obtained. Under the same conditions, the charge-discharge cycle is repeated 5,000 times, to obtain the capacity retention with respect to the initial capacity as an index of charge-discharge cycle characteristics.

For safety evaluation, overcharge tests are conducted in the following manner. Each sample battery is charged at a constant voltage of 12V in a constant temperature oven under temperature control of 25° C. The maximum current is 1,000 mA. When the battery temperature reaches 105° C., discharging is stopped. The battery temperature is measured at the center of the largest planar portion of each battery. The battery temperature is recorded during charging and for 30 minutes after the charging is stopped. The maximum temperature is compared between each of the sample batteries.

Table 1 shows the data and evaluation results of each sample.

agent 23 in the insulating porous membrane has a smaller capacity retention after 500 cycles, and a maximum temperature in the overcharge tests higher than those of Samples 1 though 3. The reason is considered as follows. Agglomeration of alumina, i.e. inorganic filler 22, during formation of the insulating porous membrane has made the thickness of the membrane non-uniform, thereby variations in the distance between the positive and negative electrodes are developed, the battery reaction becomes non-uniform, and the charge-discharge cycle characteristics are deteriorated. Further, the non-uniform thickness cannot prevent direct contact between the positive and negative electrodes during the overcharge tests, and generates so-called secondary heating where the battery temperature is elevated by the heat of reaction as well as the heat generated by short circuiting.

Now, the initial capacity is focused: Those of Sample 1 and Sample C1 are almost equal to each other; on the other hand, those of Sample 2 and Sample 3, i.e. both examples of the present invention, are larger than those of Sample C2 and Sample C3, i.e. both comparative examples, respectively; further, the difference between the examples and comparative examples is larger for a combination of Sample 3 and Sample C3.

These results are related to the fact that each of Samples 2 and 3 contains nickel in the positive electrode active material, and that Sample 3 has a larger nickel content. The lithium-containing composite oxides containing nickel used as the positive material active material tend to be decomposed by moisture. This tendency is more conspicuous in the larger nickel content. Thus, for each of Samples 2 and 3 using a silane coupling agent as active agent 23, moisture adsorption on positive electrode mixture layer 8 and decomposition of the positive electrode active material are inhibited. As a result, deterioration of the initial capacity is inhibited.

As described above, forming insulating porous membrane 21 containing inorganic filler 22 and active agent 23 on the surface of positive electrode mixture layer 8 can inhibit deterioration of battery characteristics and safety. Moreover, the use of a silane coupling agent as active agent 23, and a lithium-containing composite oxide containing nickel as the positive electrode active material can inhibit decomposition

TABLE 1

| | Positive electrode active material | Insulating porous membrane | | Initial capacity (mAh) | Capacity retention (%) | Overcharge maximum temperature (° C.) |
| --- | --- | --- | --- | --- | --- | --- |
| | | Inorganic filler | Active agent | | | |
| Sample 1 | $LiCoO_2$ | Alumina | MTMS | 1005 | 85 | 107 |
| Sample 2 | $LiNi_{1/3}Co_{1/3}Mn_{1/3}O_2$ | Alumina | MTMS | 1001 | 86 | 111 |
| Sample 3 | $LiNi_{0.80}Co_{0.15}Al_{0.05}O_2$ | Alumina | MTMS | 1000 | 82 | 110 |
| Sample C1 | $LiCoO_2$ | Alumina | None | 1003 | 80 | 132 |
| Sample C2 | $LiNi_{1/3}Co_{1/3}Mn_{1/3}O_2$ | Alumina | None | 995 | 82 | 135 |
| Sample C3 | $LiNi_{0.80}Co_{0.15}Al_{0.05}O_2$ | Alumina | None | 988 | 79 | 131 |

As obvious from Table 1, for each of the batteries of Samples 1 through 3 having insulating porous membrane 21 using active agent 23, insulating porous membrane 21 has a uniform thickness and thus the battery has a high capacity retention and is inhibited in deterioration of charge-discharge characteristics. Further, in the overcharge tests, each of the samples with active agent 23 has a lower maximum temperature at overcharge and a smaller temperature increase. On the other hand, each of Samples C1 through C3 using no active of the active material, and thus provide a non-aqueous electrolyte secondary battery having high capacity density.

Next, samples which contain different kinds of silane coupling agents as active agent 23 and different kinds of inorganic fillers 22 are described.

Used as silane coupling agents for Samples 4 through 10 are trifluoropropyl trimethoxysilane (TFPTMS), dimethyl dimethoxysilane (DMDMS), methyl triethoxysilane (MTES), decyl trimethoxysilane (DTMS), hexyl trimethoxysilane (HTMS), hexyl triethoxysilane (HTES), and hexamethyldisilazane (HMDS), respectively. Non-aqueous electrolyte secondary batteries of Samples 4 though 10 are fabricated in the manner similar to that of Sample 3, except for the silane coupling agents.

Silicon dioxide and magnesium oxide each having an average particle diameter of 0.3 µm are used for Samples 11 and 12, respectively, as inorganic fillers 22. The non-aqueous electrolyte secondary batteries of Samples 11 and 12 are fabricated in the manner similar to that of Sample 3, except for the inorganic fillers. Table 2 shows the data and evaluation results of each sample together with the results of Sample 3.

TABLE 2

| | Insulating porous membrane | | | | Overcharge Maximum |
| --- | --- | --- | --- | --- | --- |
| | Inorganic filler | Active agent | Initial capacity (mAh) | Capacity retention (%) | Temperature (° C.) |
| Sample 3 | Alumina | MTMS | 1000 | 82 | 110 |
| Sample 4 | Alumina | TFPTMS | 995 | 87 | 108 |
| Sample 5 | Alumina | DMDMS | 1000 | 82 | 111 |
| Sample 6 | Alumina | MTES | 1008 | 84 | 111 |
| Sample 7 | Alumina | DTMS | 1001 | 88 | 108 |
| Sample 8 | Alumina | HTMS | 1010 | 82 | 107 |
| Sample 9 | Alumina | HTES | 999 | 84 | 107 |
| Sample 10 | Alumina | HMDS | 1003 | 87 | 110 |
| Sample 11 | Silicon dioxide | MTMS | 1000 | 82 | 111 |
| Sample 12 | Magnesium Oxide | MTMS | 1002 | 85 | 107 |

As obvious from Table 2, each of the batteries of Samples 3 through 12 having insulating porous membrane 21 using a silane coupling agent as active agent 23, and inorganic filler 22 has an excellent initial capacity, capacity retention, and safety during overcharge.

SECOND EXEMPLARY EMBODIMENT

Figure 5:
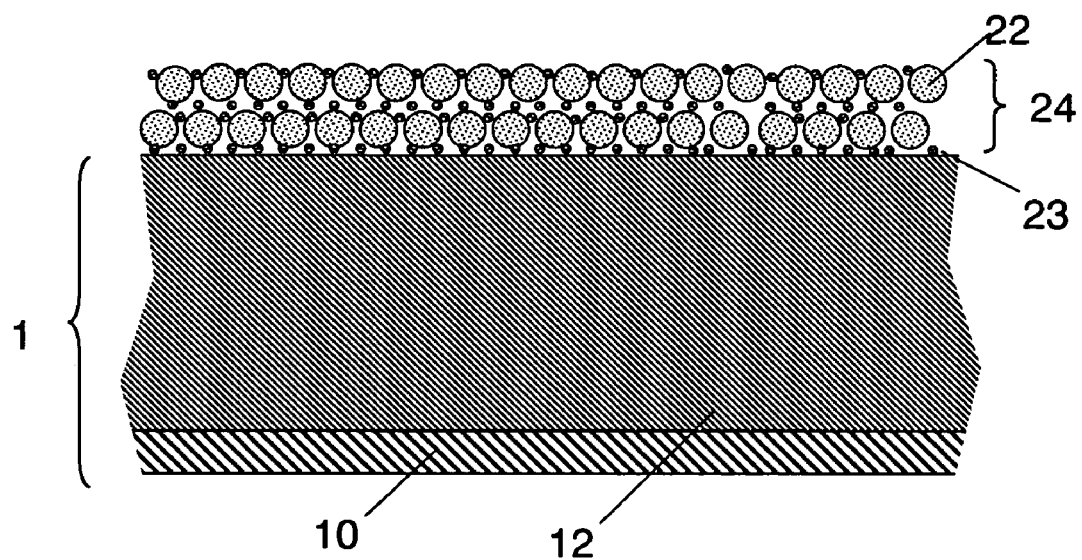
FIG. 5 is a conceptual sectional view of a negative electrode of a non-aqueous electrolyte secondary battery in accordance with a second exemplary embodiment of the present invention.

FIG. 5 is a conceptual section of a negative electrode of a non-aqueous electrolyte secondary battery in accordance with the second exemplary embodiment of the present invention. The basic structure of the non-aqueous electrolyte secondary battery in this exemplary embodiment is similar to that described in the first exemplary embodiment with reference to FIGS. 1 and 2. In this exemplary embodiment, insulating porous membrane 21 is not formed on the surface of positive electrode 2. However, insulating porous membrane 24 is formed on the surface of negative electrode mixture layer 12 of negative electrode 1. Insulating porous membrane 24 also contains inorganic filler 22 and active agent 23. On both sides of current collector 10, negative electrode mixture layer 12 and insulating porous membrane 24 are formed. FIG. 5 shows the structure thereof only on one side.

This structure can also provide the advantages similar to the first exemplary embodiment. Particularly when an oxide is used as the active material of negative electrode 1, and a silane coupling agent is used as active agent 23, the hydrophilic groups of the silane coupling agent are adsorbed or bound to the surface terminal groups, such as oxygen and hydroxyl groups, on the oxide. As a result, hydrophobic groups are arranged on the outermost surface of inorganic filler 22 covered with active agent 23. The action of hydrophobic groups can inhibit moisture adsorption on insulating porous membrane 24, and prevent the atmospheric moisture from entering into the battery through insulating porous membrane 24. Because the moisture causes deterioration of the characteristics of non-aqueous electrolyte secondary batteries, it is preferable to inhibit the entry of moisture. In other words, the use of a silane coupling agent as active agent 23 also has an advantage of inhibiting deterioration of characteristics caused by the entry of moisture.

Preferably, a silicon oxide is used as the above oxide. Because a silicon oxide has a capacity density higher than those of carbon materials, the use of the silicon oxide as the active material of negative electrode 1 can improve the energy density.

Next, the advantages of this exemplary embodiment are explained with reference to specific examples. First, a method of fabricating a non-aqueous electrolyte secondary battery of Sample A1 is described. For Sample A1, insulating porous membrane 21 is not formed on the surface of positive electrode mixture layer 8. However, insulating porous membrane 24 is formed on the surface of negative electrode mixture layer 12 in the similar procedure of fabricating Sample 1 of the first exemplary embodiment up to S03, the step of preparing of the paste. Binder 32 to be added in S04 is a modified styrene-butadiene rubber. Thus, the non-aqueous electrolyte secondary battery of Sample A1 is fabricated in a manner similar to that of Sample 1, except for the binder.

The non-aqueous electrolyte secondary battery of Sample A2 is fabricated in the similar procedure of fabricating the battery of Sample A1, except that elemental silicon is used as the active material of negative electrode 1. The non-aqueous electrolyte secondary battery of Sample A3 is fabricated in the similar procedure of fabricating the battery of Sample A1, except that a silicon oxide (SiOx, $0.3 \leq x \leq 1.3$) is used as the active material of negative electrode 1.

The non-aqueous electrolyte secondary battery of Sample A4 is fabricated in the similar procedure of fabricating the battery of Sample A3, except that $LiNi_{1/3}Co_{1/3}Mn_{1/3}O_2$ similar to the one used in Sample 2 is used as the active material of positive electrode 2. The non-aqueous electrolyte secondary battery of Sample A5 is fabricated in the similar procedure of fabricating the battery of Sample A3, except that $LiNi_{0.80}Co_{0.15}Al_{0.05}O_2$ similar to the one used in Sample 3 is used as the active material of positive electrode 2.

For comparison with these Samples A1 through A5, non-aqueous electrolyte secondary batteries of Samples C6 through C10 are fabricated in a manner similar to those of Samples A1 through A5, except that the insulating porous membrane is formed without using any active agent. Table 3 shows the data and evaluation results of each sample.

TABLE 3

|  | Positive electrode active material | Negative electrode | | Initial capacity (mAh) | Capacity retention (%) | Overcharge Maximum temperature (°C.) |
|---|---|---|---|---|---|---|
|  |  | Active substance | Active agent |  |  |  |
| Sample A1 | $LiCoO_2$ | Graphite | MTMS | 1001 | 84 | 111 |
| Sample A2 | $LiCoO_2$ | Si | MTMS | 1003 | 72 | 118 |
| Sample A3 | $LiCoO_2$ | $SiO_x$ | MTMS | 1001 | 75 | 115 |
| Sample A4 | $LiNi_{1/3}Co_{1/3}Mn_{1/3}O_2$ | $SiO_x$ | MTMS | 1000 | 72 | 118 |
| Sample A5 | $LiNi_{0.80}Co_{0.15}Al_{0.05}O_2$ | $SiO_x$ | MTMS | 998 | 70 | 113 |
| Sample C6 | $LiCoO_2$ | Graphite | None | 1002 | 76 | 125 |
| Sample C7 | $LiCoO_2$ | Si | None | 1001 | 58 | 130 |
| Sample C8 | $LiCoO_2$ | $SiO_x$ | None | 991 | 54 | 132 |
| Sample C9 | $LiNi_{1/3}Co_{1/3}Mn_{1/3}O_2$ | $SiO_x$ | None | 987 | 54 | 130 |
| Sample C10 | $LiNi_{0.80}Co_{0.15}Al_{0.05}O_2$ | $SiO_x$ | None | 984 | 52 | 131 |

As obvious from Table 3, for each of the batteries of Samples A1 through A5 having insulating porous membrane 24 using active agent 23, insulating porous membrane 24 has a uniform thickness, thereby the battery has a high capacity retention and is inhibited in deterioration of charge-discharge cycle characteristics. Further, in the overcharge tests, each battery has a lower overcharge maximum temperature and a smaller temperature increase. For each of Samples A2 through A5, the capacity retention of the battery is smaller than that of Sample A1. This is because each of Samples A2 through A5 has a larger deterioration in the negative electrode active material in the course of charge-discharge cycles as compared with Sample A1 in which graphite is used as the negative electrode active material.

On the other hand, each of Samples C6 through C10 using no active agent in the insulating porous membrane has a smaller capacity retention after 500 cycles, and a higher maximum temperature in the overcharge tests as compared with Samples A1 through A5. The reason is considered as follows. Agglomeration of alumina, i.e. inorganic filler 22, during formation of the insulating porous membrane has made the thickness of the membrane non-uniform, thereby variations in the distance between the positive and negative electrodes are developed, the battery reaction becomes non-uniform, and the charge-discharge cycle characteristics are deteriorated. Further, the non-uniform thickness cannot prevent direct contact between the positive and negative electrodes during the overcharge tests, and generates secondary heating.

Now, the initial capacity is focused: Samples A1 and C6, and Samples A2 and C7 are almost equal to each other; on the other hand, Sample A3 is slightly larger than Sample C8; for each of the pairs of Samples A4 and C9, and Samples A5 and C10, difference in the initial capacity is larger in this order. These results are related to the fact that each of Samples A3 through A5 uses a silicon oxide as the negative electrode active material, each of Samples A4 and A5 contains nickel in the positive electrode active material, and Sample A5 has a larger nickel content.

When an oxide is used as the negative electrode active material, the negative electrode is likely to adsorb moisture. When the moisture enters into the battery, it reacts with lithium ions reduced in negative electrode 1 during charging and thus increases irreversible capacity. For this reason, the initial capacity deteriorates. Further, the moisture also affects the charge-discharge cycle characteristics. For each of Samples A4 and A5 containing nickel as the positive electrode active material, this moisture also decomposes the positive electrode active material. This tendency is more conspicuous in the larger nickel content. For this reason, the use of a silane coupling agent as active agent 23 can inhibit moisture adsorption on positive electrode mixture layer 12, and thus the entry of moisture into the battery. As a result, deterioration of the initial capacity is inhibited.

As described above, forming insulating porous membrane 24 including inorganic filler 22 and active agent 23 on the surface of negative electrode mixture layer 12 can inhibit deterioration of battery characteristics and safety. Moreover, the use of a silane coupling agent as active agent 23, and a silicon oxide as the negative electrode active material can provide a non-aqueous electrolyte secondary battery having high capacity density. Though not illustrated, the use of inorganic fillers 22 and silane coupling agents identical to those used in Samples 4 through 12 of the first exemplary embodiment instead of inorganic fillers 22 and the silane coupling agents of Samples A1 through A5 of this exemplary embodiment can provide the similar advantages.

THIRD EXEMPLARY EMBODIMENT

Figure 6:
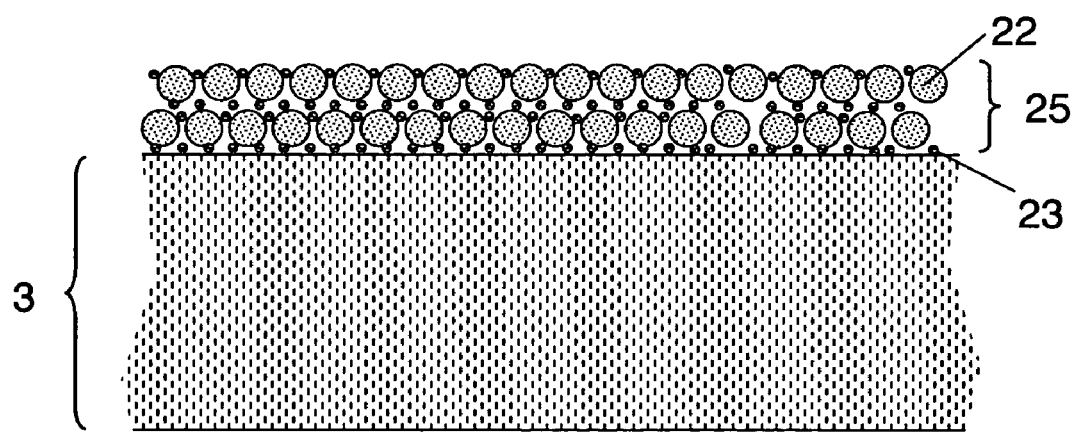
FIG. 6 is a conceptual sectional view of a separator of a non-aqueous electrolyte secondary battery in accordance with a third exemplary embodiment of the present invention.

FIG. 6 is a conceptual section of a separator of a non-aqueous electrolyte secondary battery in accordance with the third exemplary embodiment of the present invention. The basic structure of the non-aqueous electrolyte secondary battery of this exemplary embodiment is similar to that of the first exemplary embodiment described with reference to FIGS. 1 and 2. In this exemplary embodiment, insulating porous membrane 21 is not formed on the surface of positive electrode 2. However, insulating porous membrane 25 is formed on the surface of separator 3. Insulating porous membrane 25 also contains inorganic filler 22 and active agent 23. Insulating porous membrane 25 may be formed on one side of separator 3 as shown in FIG. 6, or on both sides thereof. For insulating porous membrane 25, it is preferable to use binder 32 having similar quality to or affinity with the binder contained in the mixture layer of the electrode (negative electrode 1 or positive electrode 2) which contacts with insulating porous membrane 25. Such a binder allows insulating porous membrane 25 to be supported by the electrode, maintains the membrane shape, and securely prevents contact between positive electrode 1 and negative electrode 2, even when separator 3 is shrunken by heat. Alternatively, it is also preferable to use, as binder 32, a heat-resistant resin different from the binder used for negative electrode 1 or positive electrode 2. In this case, even when insulating porous membrane 25 is provided on any side of separator 3, no consideration has to be given to overlapping of the membrane surface and positive electrode 2 or negative electrode 1. For this reason, workability is improved.

This structure can also provide the advantages similar to those of the first exemplary embodiment. For this exemplary embodiment, particularly a heat-resistant resin, such as fibrous polyimide and aromatic polyamide (aramid) resins, may be used as binder 32 of insulating porous membrane 25. These heat-resistant resins are swollen by absorption of moisture in the atmospheric air. However, when a silane coupling agent is used as active agent 23, the water repellency of the silane coupling agent inhibits these heat-resistant resins from absorbing moisture. Because the polyimide and aramid resins have excellent heat resistance, they not only maintain the membrane shape of insulating porous membrane 25 as binder 32, but also work as an auxiliary agent of inorganic filler 22. For these reasons, these resins are preferable. However, because the polyimide and aramid resins are hygroscopic swelling, they pose the following problems.

When insulating porous membrane 25 swells, the permeability of electrolyte solution into the membrane considerably decreases. Further, the swelling membrane has less capability of holding the electrolyte solution therein. These factors decrease the amount of electrolyte solution held in separator 3 during charge-discharge cycle tests, thereby the capacity retention on charging and discharging is considerably decreased.

Figure 7A:
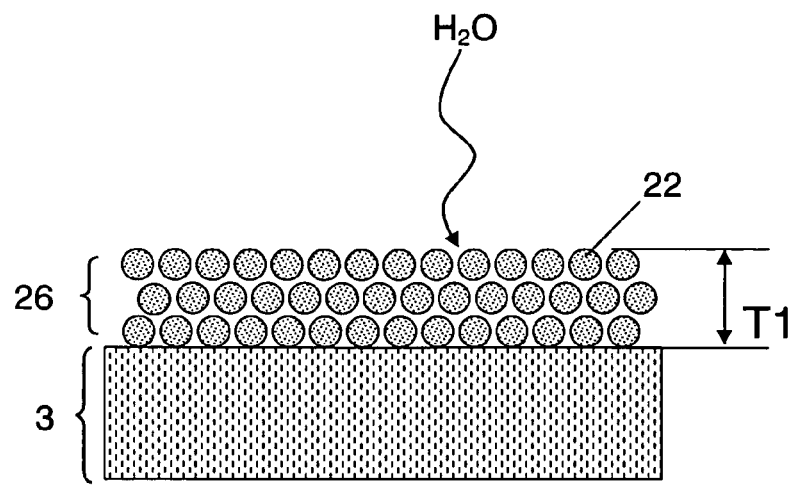
FIGS. 7A through 7C are conceptual sectional views of an insulating porous membrane which is different from the exemplary embodiments of the present invention and is provided on a separator.
Figure 7B:
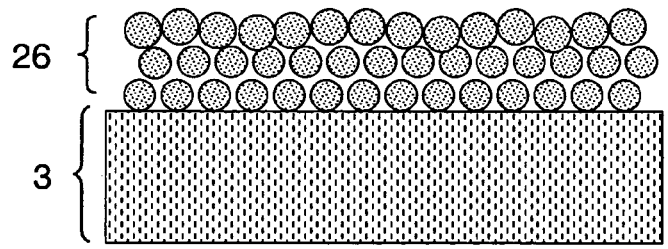
Figure 7C:
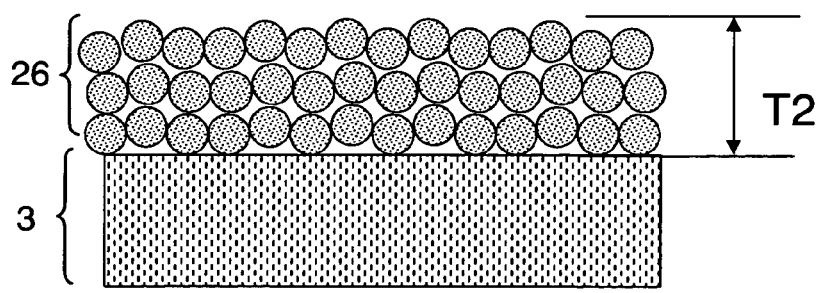

These problems are explained with reference to FIGS. 7A through 7C. FIGS. 7A through 7C are conceptual sections illustrating how an insulating porous membrane that is different from that of the exemplary embodiments of the present invention and provided on a separator, and contains no silane coupling agent is changed by moisture. For simplicity, insulating porous membrane 26 is shown only by inorganic filler 22.

As shown in FIG. 7A, when insulating porous membrane 26 containing no silane coupling agent is provided on separator 3, moisture in the atmospheric air adsorbs on inorganic filler 22. This adsorption can also be seen when separator 3 having insulating porous membrane 26 is handled in an atmosphere having a dew point of −50° C. Then, as shown in FIG. 7B, inorganic filler 22 that has adsorbed moisture swells. As time elapses, the inorganic filler 22 swells throughout insulating porous membrane 26. As a result, as shown in FIG. 7C, the thickness of insulating porous membrane 26 increases from initial T1 to T2. This causes the above deterioration of the permeability of electrolyte solution into the membrane and battery characteristics. When a hygroscopic swelling heat-resistant resin, such as polyimide and aramid resins, is used as binder 32, these resins also absorb moisture and swell. For this reason, the above phenomena are more conspicuous. In contrast, in the present exemplary embodiment, the use of a silane coupling agent for insulating porous membrane 25 can address such problems.

Next, the advantages of the present exemplary embodiment are described with reference to specific examples. First, a method of fabricating a non-aqueous electrolyte secondary battery of Sample B1 is explained. For Sample B1, insulating porous membrane 21 is not formed on the surface of positive electrode mixture layer 8. However, insulating porous membrane 25 is provided on separator 3 on the side contact with positive electrode 2, using a paste identical to that of Sample 3 of the first exemplary embodiment, in the similar procedure of fabricating Sample 3. Insulating porous membrane 25 formed on the side contacting with positive electrode 2 contains PVDF as binder 32. The non-aqueous electrolyte secondary battery of Sample B1 is fabricated in the manner similar to that of Sample 3, except for these steps.

For Sample B2, insulating porous membrane 21 is not formed on the surface of positive electrode mixture layer 8. However, insulating porous membrane 25 is formed on separator 3 on the side contacting with negative electrode 1, using a paste similar to that of Sample A1, in the similar procedure of fabricating Sample 3 of the first exemplary embodiment. Insulating porous membrane 25 formed on the side contacting with negative electrode 1 contains SBR as binder 32. The non-aqueous electrolyte secondary battery of Sample B2 is fabricated in the manner similar to that of Sample 3, except for these steps.

For Sample B3, insulating porous membrane 21 is not formed on the surface of positive electrode mixture layer 8. However, insulating porous membrane 25 is formed on separator 3 on both sides thereof, using a paste similar to that of Sample 3 of the first exemplary embodiment, in the similar procedure of fabricating Sample 3. Insulating porous membrane 25 contains a fibrous aramid resin as binder 32. The non-aqueous electrolyte secondary battery of Sample B3 is fabricated in the manner similar to that of Sample 3, except for these steps.

For Sample B4, insulating porous membrane 21 is not formed on the surface of positive electrode mixture layer 8. However, insulating porous membrane 25 is formed on separator 3 on both sides, using a paste similar to that of Sample 3 of the first exemplary embodiment, in the similar procedure of fabricating Sample 3. Insulating porous membrane 25 contains soluble polyimide as binder 32. The non-aqueous electrolyte secondary battery of Sample B4 is fabricated in the manner similar to that of Sample 3, except for these steps.

For comparison with these Samples B1 through B4, non-aqueous electrolyte secondary batteries of Samples C11 through C14 are fabricated in a manner similar to those of Samples B1 through B4, except that insulating porous membrane 26 is formed without using any active agent.

TABLE 4

| | Insulating porous membrane | | Initial capacity (mAh) | Capacity retention (%) | Overcharge maximum temperature (° C.) |
|---|---|---|---|---|---|
| | Active agent | Binder | | | |
| Sample B1 | MTMS | PVDF | 1001 | 87 | 109 |
| Sample B2 | MTMS | SBR | 1003 | 88 | 112 |
| Sample B3 | MTMS | Aramid | 1000 | 84 | 111 |
| Sample B4 | MTMS | Polyimide | 999 | 85 | 113 |
| Sample C11 | None | PVDF | 990 | 75 | 131 |
| Sample C12 | None | SBR | 989 | 71 | 131 |
| Sample C13 | None | Aramid | 985 | 60 | 121 |
| Sample C14 | None | Polyimide | 985 | 62 | 125 |

Positive electrode active material: $LiNi_{0.80}Co_{0.15}Al_{0.05}O_2$
Negative electrode active material: Graphite
Inorganic filler of insulating porous membrane: Alumina As obvious from Table 4, for each of the batteries of Samples B1 through B4 having insulating porous membrane 25 using active agent 23, insulating porous membrane 25 has a uniform thickness and thus the battery has a high capacity retention and is inhibited in deterioration of charge-discharge cycle characteristics. Further, in the overcharge tests, each cell has a lower overcharge maximum temperature and a smaller temperature increase.

On the other hand, each of Samples C11 through C14 using no active agent 23 in insulating porous membrane 26 has a smaller capacity retention after 500 cycles, and a higher maximum temperature in the overcharge tests as compared with Samples B1 through B4. The reason is considered as follows. Agglomeration of alumina, i.e. inorganic filler 22, during formation of insulating porous membrane 26 has made the thickness the membrane non-uniform, thereby variations in the distance between positive electrode 2 and negative electrode 1 are developed, the battery reaction becomes non-uniform, and the charge-discharge cycle characteristics are deteriorated. Further, the non-uniform thickness cannot prevent direct contact between positive electrode 2 and negative electrode 1 during the overcharge tests, and generates secondary heating.

In the case of Samples C11 through C14, the initial capacity is likely to be influenced also by the moisture entering into the battery through adsorption onto or absorption into insulating porous membrane 26 formed on separator 3, because $LiNi_{0.80}Co_{0.15}Al_{0.05}O_2$ is used as the positive electrode active material. Particularly, Sample C13 uses a fibrous aramid resin as binder 32, and thus exhibits more conspicuous influence. In contrast to this sample, each of Samples B1 through B4 provides the initial capacity as designed.

Each of Samples C11 through C14 is suffered from the influence of the moisture entering into the battery and has lower capacity retention as compared with Samples B1 through B4. Further, the capacity retention of Sample C13 is approximately by 10% lower than those of Samples C11 and C12. This is because the aramid resin, i.e. binder 32, is swollen with the moisture, which decreases the amount of the held electrolyte solution, thereby the electrolyte solution becomes insufficient in separator 3 and the diffusion of lithium ions becomes insufficient. Also for Sample C14, because the polyimide resin is hygroscopic, the capacity retention thereof is as low as that of Sample C13 using the aramid resin.

In this manner, silane coupling agents prevent water absorption of inorganic filler 22 and a fibrous aramid resin as binder 32, which are the components of insulating porous membrane 25, i.e. a heat-resistant layer.

As described above, forming insulating porous membrane 25 containing inorganic filler 22 and active agent 23 on the surface of separator 3 can inhibit deterioration of battery characteristics and safety. Further, the use of a silane coupling agent as active agent 23 and a fibrous aramid resin as binder 32 can provide a non-aqueous electrolyte secondary battery ensuring higher safety. Though not illustrated, materials similar to those of Samples 4 through 12 of the first exemplary embodiment can be used as inorganic filler 22 and the silane coupling agent.

In each of the exemplary embodiments, the insulating porous membrane is provided on either of positive electrode 2, negative electrode 1, or separator 3. However, the membrane may be provided on at least two components thereof. Such a structure further improves safety.

In each of the exemplary embodiments, a prismatic battery having a wound electrode body is described. However, the battery of the present invention is not limited to the prismatic shape. The present invention can be implemented by a flat battery, a wound cylindrical battery, and a laminated prismatic battery.

What is claimed is:

1. A non-aqueous electrolyte secondary battery comprising:
    a positive electrode;
    a negative electrode;
    a separator and a non-aqueous electrolyte disposed between the positive electrode and the negative electrode; and
    an insulating porous membrane provided on a surface of at least one of the positive electrode, the negative electrode, and the separator, and having an inorganic filler, and an active agent which has a hydrophobic group and a hydrophilic group, and is capable of preventing the inorganic filler from agglomerating.

2. The non-aqueous electrolyte secondary battery of claim 1, wherein the active agent is a silane coupling agent.

3. The non-aqueous electrolyte secondary battery of claim 2, wherein the positive electrode has a composite oxide containing nickel as an active material thereof, and the insulating porous membrane is provided at least on the surface of the positive electrode.

4. The non-aqueous electrolyte secondary battery of claim 2, wherein the negative electrode has an oxide as an active material thereof, and the insulating porous membrane is provided at least on the surface of the negative electrode.

5. The non-aqueous electrolyte secondary battery of claim 4, wherein the oxide is a silicon oxide.

6. A method of manufacturing a non-aqueous electrolyte secondary battery, the method comprising:
    mixing an inorganic filler, an active agent which has a hydrophobic group and a hydrophilic group, and is capable of preventing the inorganic filler from agglomerating, and a dispersion medium to prepare a paste;
    applying the paste on a surface of at least one of a positive electrode, a negative electrode, and a separator;
    removing the dispersion medium to form an insulating porous membrane on the surface of at least one of the positive electrode, the negative electrode and the separator;
    forming an electrode group by disposing the separator between the positive electrode and the negative electrode, and
    sealing the electrode group into an outer case together with an electrolyte solution.

* * * * *